US009275112B2

(12) United States Patent
Jakobsen

(10) Patent No.: US 9,275,112 B2
(45) Date of Patent: Mar. 1, 2016

(54) FILTERING VIEWS WITH PREDEFINED QUERY

(71) Applicant: Microsoft Corporation, Redmond, WA (US)

(72) Inventor: Claus Jakobsen, Copenhagen (DK)

(73) Assignee: Microsoft Technology Licensing, LLC, Redmond, WA (US)

( * ) Notice: Subject to any disclaimer, the term of this patent is extended or adjusted under 35 U.S.C. 154(b) by 1 day.

(21) Appl. No.: 13/673,775

(22) Filed: Nov. 9, 2012

(65) Prior Publication Data

US 2014/0136552 A1 May 15, 2014

(51) Int. Cl.
*G06F 17/30* (2006.01)
*G06F 21/62* (2013.01)

(52) U.S. Cl.
CPC .... *G06F 17/30507* (2013.01); *G06F 17/30522* (2013.01); *G06F 21/6227* (2013.01)

(58) Field of Classification Search
USPC .......................................................... 707/754
See application file for complete search history.

(56) References Cited

U.S. PATENT DOCUMENTS

| 6,850,944 | B1* | 2/2005 | MacCall et al. ........................ 1/1 |
| 7,356,840 | B1 | 4/2008 | Bedell et al. |
| 2005/0060647 | A1* | 3/2005 | Doan et al. ........................ 715/514 |
| 2006/0136479 | A1* | 6/2006 | Fan et al. ........................ 707/102 |
| 2006/0224692 | A1* | 10/2006 | Gupta ........................ 709/217 |
| 2007/0220004 | A1* | 9/2007 | Fifield et al. ........................ 707/9 |
| 2007/0250472 | A1 | 10/2007 | Dettinger et al. |
| 2008/0104051 | A1* | 5/2008 | Gosper ........................ 707/5 |
| 2009/0150663 | A1* | 6/2009 | Perry ........................ 713/150 |
| 2010/0257107 | A1* | 10/2010 | Sullivan et al. ........................ 705/301 |
| 2011/0214064 | A1* | 9/2011 | Schneider et al. ........................ 715/741 |
| 2012/0124094 | A1 | 5/2012 | Olivieri et al. |
| 2013/0124528 | A1* | 5/2013 | Gourdol et al. ........................ 707/740 |
| 2013/0318106 | A1* | 11/2013 | Shepard et al. ........................ 707/754 |

OTHER PUBLICATIONS

"Query tables in Business Process Choreographer", Retrieved at <<http://publib.boulder.ibm.com/infocenter/dmndhelp/v7r0mx/index.jsp?topic=%2Fcom.ibm.websphere.bpc.doc%2Fdoc%2Fbpc%2Fc6bpel_querytables.html>>, May 22, 2012, pp. 3.
"Sun Web Application Guidelines—Version 4.0", Retrieved at <<http://developers.sun.com/docs/web-app-guidelines/uispec4_0/12-search.html#12.1.1.1>>, Retrieved Date: Aug. 6, 2012, pp. 21.
"Support Practices / BMC Service Desk Express User Guide", Retrieved at <<http://www.ccs.uottawa.ca/professionals/support-magic/bmcsde.pdf>>, Retrieved Date: Aug. 6, 2012, pp. 70.
"Google Analytics Installation Guide", Retrieved at <<http://support.google.com/googleanalytics/bin/answer.py?hl=en&answer=74932>>, Retrieved Date: Aug. 6, 2012, pp. 5.

(Continued)

*Primary Examiner* — Jay Morrison
(74) *Attorney, Agent, or Firm* — Thomas Marquis; Jim Ross; Micky Minhas

(57) ABSTRACT

An application, such as a data store application, provides a filter query to manage access to a view of a data store. The application uses the filter query to restrict or shape access to the view. A user constructs the filter query using a query constructor component of the application. The application attaches the constructed filter query to the view. The application may extract the structure of the query and combine that with the original view to generate a filtered view result in place of the original view result.

20 Claims, 10 Drawing Sheets

(56) References Cited

OTHER PUBLICATIONS

"Setting Up Predefined Queries", Retrieved at <<http://docs.oracle.com/cd/B40099_02/books/AppsAdmin/AppsAdminOngoingTasks3.html>>, Retrieved Date: Aug. 6, 2012, pp. 2.

"International Search Report & Written Opinion Received for PCT Patent Application No. PCT/US2013/069358", Mailed Date: Jul. 31, 2014, 8 Pages.

Franceschina, Nick, "Views Exposed Filters Default to Empty Result Set", Published on: Jan. 14, 2009, Available at: http://web.archive.org/web/20090215135332/http://drupal.org/node/358546.

* cited by examiner

← 400B

| CUSTOMER | | | ← 432 |
|---|---|---|---|
| ID | SALESPERSON ID | POSTINGGROUP | |
| X | A | 1 | |
| Z | A | 2 | |
| | | | |
| | | | |
| | | | |
| | | | |

| ACCOUNT | | ← 434 |
|---|---|---|
| ID | | |
| 5001 | | |
| 5002 | | |
| | | |
| | | |
| | | |
| | | |

| CUSTOMERPOSTINGGROUP | | | ← 436 |
|---|---|---|---|
| ID | ACCOUNT ID | DESCRIPTION | |
| 1 | 5001 | GOLD | |
| 2 | 5002 | SILVER | |
| 3 | 5900 | NOT RATED | |
| 4 | 5200 | BRONZE | |

| FILTER ON CUSTOMERPOSTINGGROUP.ID = 1 (GOLD), PERSON A | | | |
|---|---|---|---|
| CUSTOMER | | | |
| ID | SALESPERSON ID | POSTINGGROUP | |
| X | A | 1 | |
| | | | |
| | | | |

← 444

| FILTER ON CUSTOMERPOSTINGGROUP.ID = 1 (GOLD), PERSON B | | | |
|---|---|---|---|
| CUSTOMER | | | |
| ID | SALESPERSON ID | POSTINGGROUP | |
| V | B | 1 | |
| X | A | 1 | |
| | | | |

| PERSON B: FILTER AS PERSON C | | | |
|---|---|---|---|
| CUSTOMER | | | ACCOUNT |
| ID | SALESPERSON ID | POSTINGGROUP | ID |
| T | C | 4 | 5002 |
| Y | C | 2 | 5200 |
| | | | |

*FIG. 4D*

FILTERING VIEWS WITH PREDEFINED QUERY

BACKGROUND

Data services technologies have enabled multiple computing resources to provide coordinated and distinct solutions. An example of data services, data warehouses bring together multiple systems to provide storage solutions to user needs. Data warehouses can span a vast array of computing resources. The computing resources utilized in data warehouse applications are dispersed across networks and locations. Dispersed computing resources are remotely controlled and managed. Usually, manual or scripted solutions provide installation and configuration support to data warehouse assets. Manual installation solutions by human components of widely dispersed computing resources are not cost effective. Scripted solutions are not flexible to meet dynamic requirements.

Effective access to data sets stored in data warehouses and similar data services are an area in contention for improvement among modern data services solutions. Most data consumers are not technically skilled to effectively extract data from data services. Many lack skills to write queries to provide solutions to data extraction demands. Others, while having sufficient technical skill, may lack privileges sufficient to extract data from the services. Yet others may simply lack resources and time to effectively query data sets and extract data to fulfill demand. Alternatively, application based solutions remove the need for technical skill to extract data from data services. However, most application based solutions provide standardized solutions that limit access to the data. Standardized solutions can lack fine tuning functionality to enable a user to further refine extraction solutions sufficient to fulfill user demand.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing a filter query to manage access to views. According to some embodiments, an application may receive a filter query from a user. The application may be a data store application managing data and access to the data. The application may associate the query to a view by attaching the query to the view. Next, the application may detect a request for the view. The application may extract the structure of the query and combine that with the original view to generate a filtered view result in place of the original view result.

These and other features and advantages will be apparent from a reading of the following detailed description and a review of the associated drawings. It is to be understood that both the foregoing general description and the following detailed description are explanatory and do not restrict aspects as claimed.

BRIEF DESCRIPTION OF THE DRAWINGS

FIG. 4A through 4D illustrate the sets of records the users of FIGS. 2 and 3 have access to as well as how the data source would look for records with the filters applied according to embodiments;

DETAILED DESCRIPTION

Figure 1:
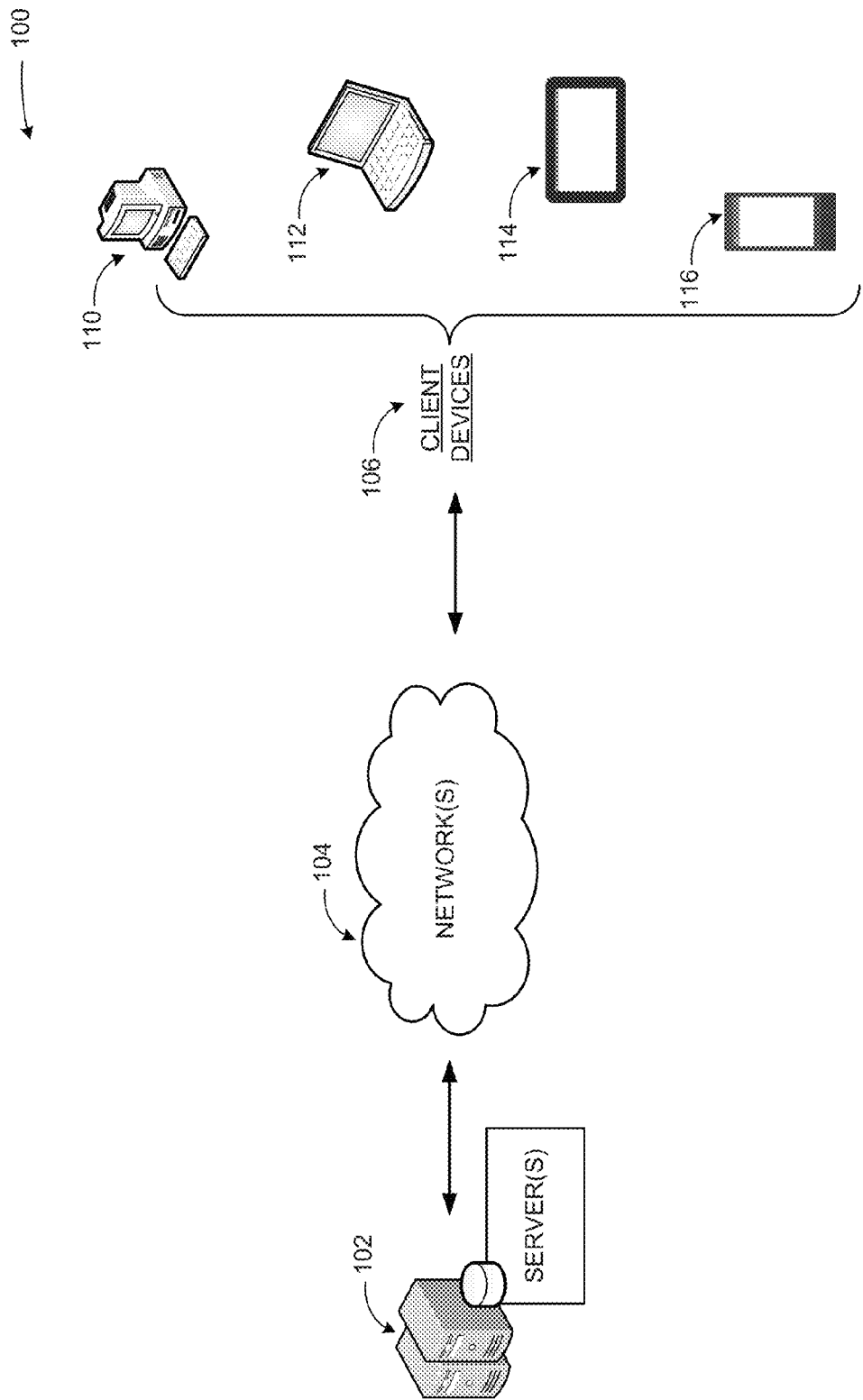
FIG. 1 illustrates an example network diagram where an application may provide a filter query to manage access to a view according to some embodiments.

As briefly described above, an application may provide a filter query to manage access to a view. The application may receive a filter query, associate the query to a view by attaching the query to the view, extract the structure of the query and combine that with the original view to generate a filtered view result in place of the original view result. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

According to some embodiments, a view may be a representation of a data table. The view may encompass all of the data elements or partial data elements of the data table. The view may be formatted, sorted, and/or structured according to user demands. A query may be a short executable script that may be interpreted and executed by a data store application to provide data from a data store. The script may be written in Structured Query Language (SQL), for example, used commonly in data store operations. A query may extract data from multiple views. The query may match common elements across views and retrieve data from associated views according to the common elements. The query may be attached to the associated views. And, an application such as a data store application may manage combining the view and the query such that the query is used to filter the results of executing the view, and (manage) execution of the thus filtered view in response to user requests.

Throughout this specification, the term "platform" may be a combination of software and hardware components for providing a filter query to manage access to views. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Referring to FIG. 1, diagram 100 illustrates an example network diagram where an application may provide a filter query to manage access to a view according to some embodiments. The components and environments shown in diagram 100 are for illustration purposes. Embodiments may be implemented in various local, networked, cloud-based and similar computing environments employing a variety of computing devices and systems, hardware and software.

In an example environment illustrated in diagram 100, one or more servers 102 may host an application managing and providing access to a data store. The client devices 106 may execute client applications providing access to the data on the data store. An application such as data store application may control and monitor access to the data. The servers 102 may communicate with client devices 106 through networks 104. The network(s) 104 may be any network architecture providing access to the servers 102 through wired or wireless technology.

Client devices 106 may include a variety of hardware such as desktop computer 110, laptop computer 112, a tablet device 114 such as a slate, and a smart phone 116. The client devices 106 may execute a client component of an application filtering views with queries. The client devices 106 may enable a user to build queries for views hosted by the data store of servers 102. The application managing the data store may receive the query and attach to associated views to replace query results with the view for a user requesting the view.

The example scenarios above describe the application having components interacting in a thick-client server architecture. Alternatively, the application may work in a thin-client and server-oriented architecture. The client devices 110-116 may execute an application accessing services provided by server 102. The services provided by servers 102 may include query configuration, query attachment to a view, and query execution to replace query results with the view. An example may include accessing the services through a web browser and display server applications managing query based filtering of a view through the web browser.

Figure 2:
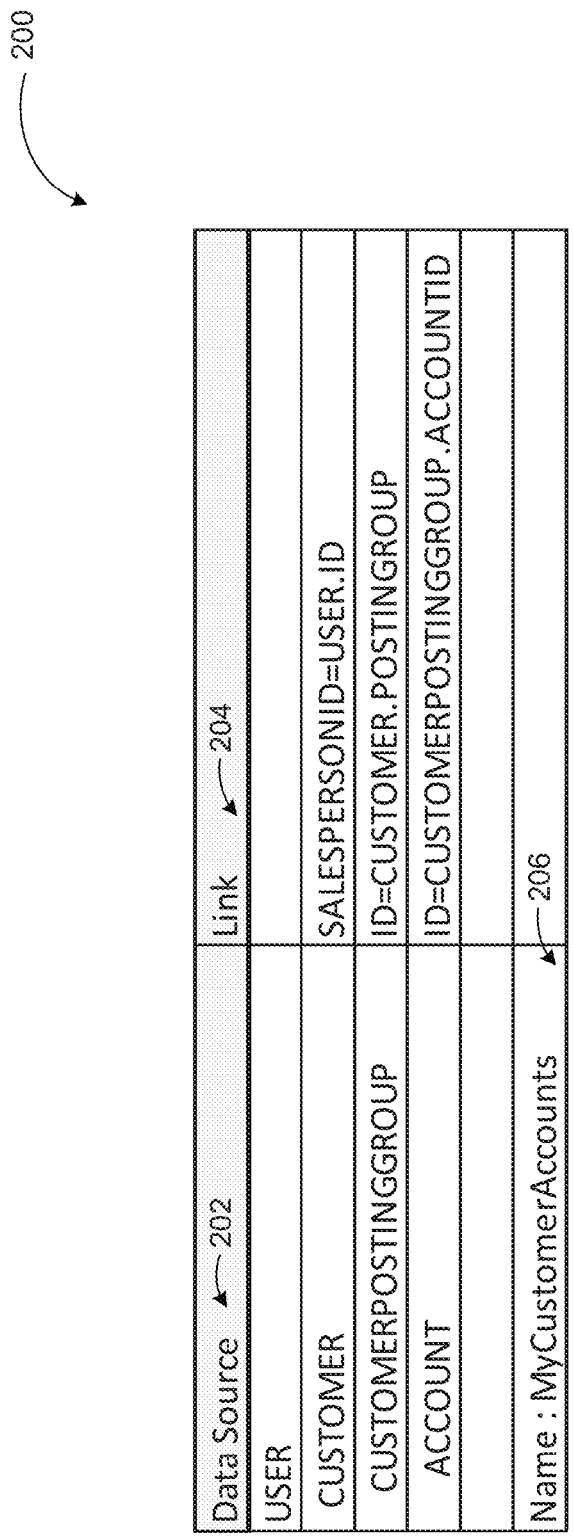
FIG. 2 illustrates an example of a basic query definition for the accounts belonging to a user.

FIG. 2 illustrates an example of a basic query definition for the accounts belonging to a user according to some embodiments. Diagram 200 displays example components of a query to filter a view of a data store.

According to some embodiments, a business or database search application may provide a user interface for configuring a filter query. An experienced or expert user with deep knowledge about the underlying data structure may be enabled to configure the query using common elements between views. Some example embodiments provide a separation of the definition of the query and the usage of the query through the mechanisms described herein. The configuration user interface in diagram 200 provides an example of a basic query definition for the accounts belonging to a given user and may enable the user to set or modify the definitions. The user interface provides the structure of the data sources 202 in relation to each other and the link(s) 204 between them. The user interface may provide a name 206 used by the data store to identify the view.

In an example scenario, a data store application may provide a user with a selection of views to build one or more filtering queries through a user interface component of the application. Initially, the application may authenticate the user. Authenticated user's privileges may determine which selection of views to load to the user interface. If a user has read access to one of the views, the view may be loaded to the user interface. The application may further determine views to load according to the relationships between the originally loaded view and other views. It could be a relationship between a CUSTOMER view and a SALES ORDER view where the SALES ORDER view has a relation to the CUSTOMER that is the owner of the SALES ORDER. The application may determine common elements between the views and provide the views as a selection to build the query. An example user may select one or more views through the user interface.

The application may construct the query using the common elements between the views. The application may also display the filter query string in a textbox as the user selects views. The application may also enable the user to edit the query string in the textbox. The application may disable the query and warn a user editing the filter query of nonfunctioning parts if the application detects the user including views or other structures unrelated to the views.

Figure 3:
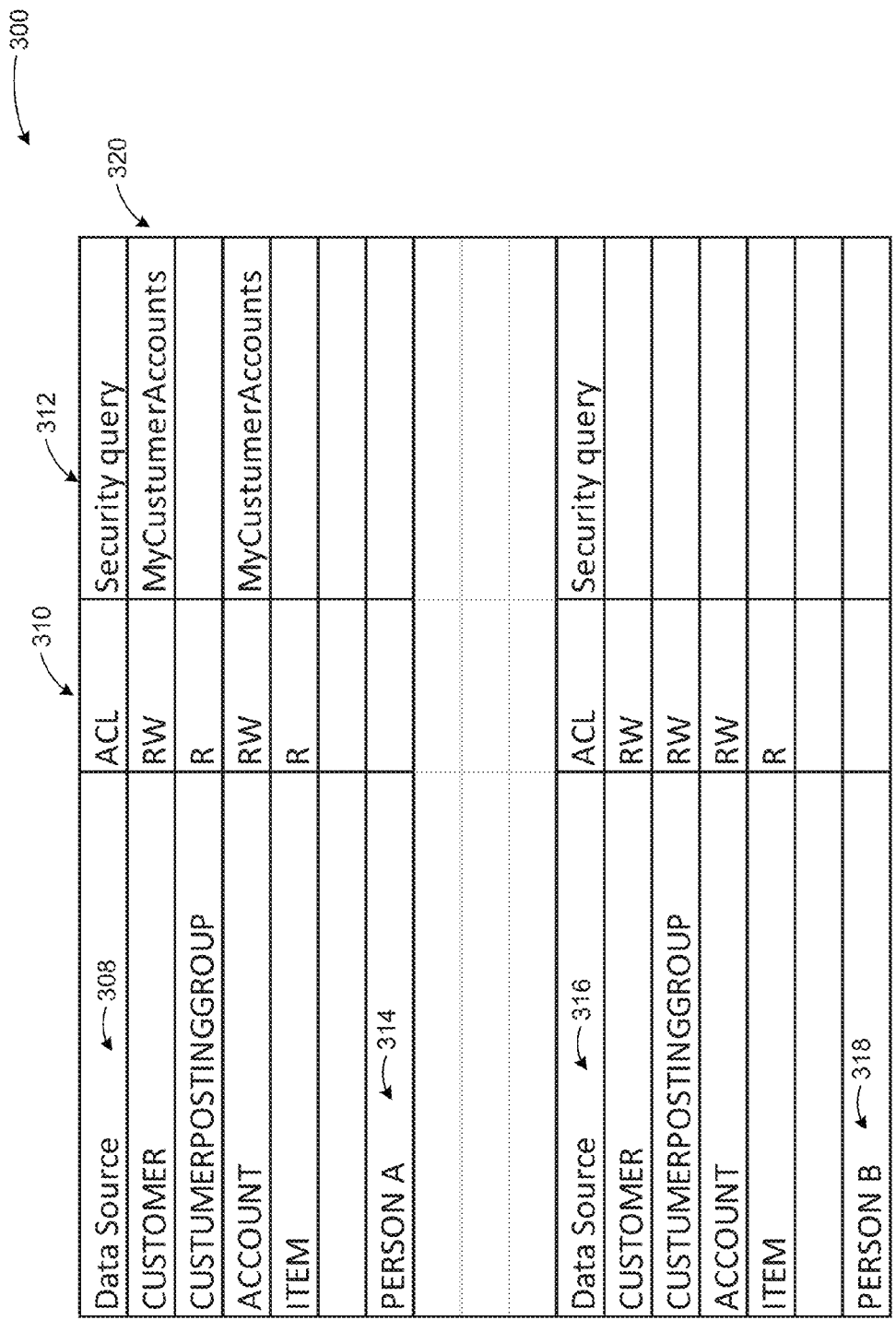
FIG. 3 illustrates an example of two users, one with limited rights and the other with full access, and their security configuration of the tables used in FIG. 2.

FIG. 3 illustrates an example of two users, one with limited rights and the other with full access, and their security configuration of the tables used in FIG. 2. In diagram 300, Person A with limited rights and Person B with full access and their security configuration of the tables used in diagram 200 are shown.

According to some embodiments, the same query may be used to limit multiple data sources (CUSTOMER & ACCOUNT) as they are both part of the structure of the query from diagram 200. The table in diagram 300 includes data source 308 column for the data sources such as customer, customer posting group, account, and item; access control list 310 column listing individual access rights for the data sources; and a security query 312 column listing the associated query(ies) 320. According to the example configuration, Person A 314 has read and write access to the customer records limited by the security query "MyCustomerAccounts", read access to the customer posting group, read and write access to the account records limited by the security query "MyCustomerAccounts", and read access to the item records. Person B 318 has read and write access to customer, customer posting group and account records, while having read access to the item records.

FIG. 4A through 4D illustrate the sets of records the users of FIGS. 2 and 3 have access to as well as how the data source would look for records with the filters applied according to embodiments.

Figure 4A:
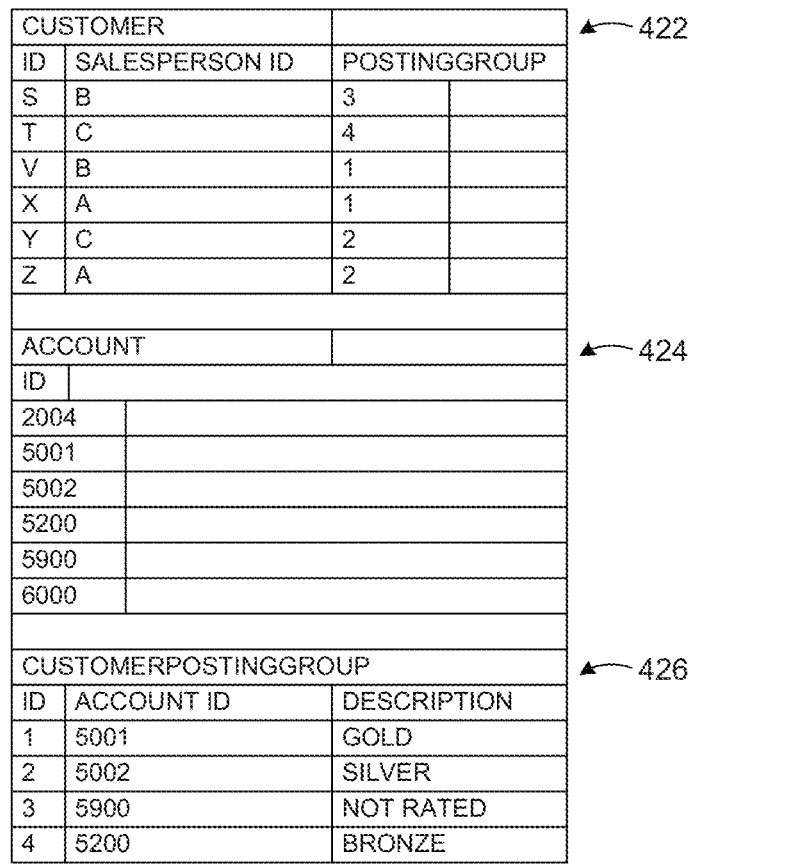

Diagram 400A in FIG. 4A includes a full list of records in the data sources and at the same time the records Person B from FIG. 3 has access to. The records are grouped by data sources such as customer 422, account 424, and customer posting group 426. The records link customer identifiers to sales person identifiers and posting group identifiers. They also link customer posting group identifiers to account identifiers and descriptions (e.g. ratings), in addition to a list of available account identifiers.

Diagram 400B includes the set of records Person A has access to (a subset of the records in diagram 400A). Based on the example configuration in diagram 300, Person A is limited by the query defined in FIG. 2 "MyCustomerAccounts" for the data sources CUSTOMER and data source ACCOUNT. There is no limit to the CUSTOMER POSTING GROUP data source as that has no security filter defined in diagram 300.

Diagram 400C shows how the CUSTOMER data source may look for Person A and Person B, 442 and 444 respectively, when the filter is applied on the CUSTOMER data source limiting it to show records with CUSTOMER POSTING GROUP 1. If the user applies a filter (in the example scenario to show only the "GOLD" customers), it may be combined with the already setup security filter. This may also be a predefined query that the user may choose to apply by himself or herself Diagram 400D shows an example 452, where a user with full access (e.g. Person B) chooses to apply the security filter that is defined in FIG. 2. According to the example scenario, Person B may have elected to act as Person C, which is identified by having SALESPERSON ID="C".

In some example embodiments, the application may attach the constructed filter query to a view. When the application detects predetermined criteria, the application may extract the structure of the query and combine that with the original view to generate a filtered view result in place of the original view result. The application may evaluate the request to determine criteria sufficient to trigger extraction of the structure of the query and to combine that with the original view in order to generate a filtered view result in place of the original view result by evaluating user access rights to the view and a user requesting the view. Examples of access rights may include: read, write, and/or create privileges for the view or its elements. If the predetermined criteria include a user's privilege to access the views, the application may use the user's privilege as the predetermined criteria to extract the structure of the query and combine that with the original view to generate a filtered view result in place of the original view result, as well as tailor a response to the request to only display relevant data to the user.

In some example embodiments a view may be defined using SQL and a definition may look like this:
SELECT ID, NAME
FROM ACCOUNT
Furthermore the filter query may also be defined using SQL and a definition could look like this:

```
SELECT ACCOUNT.ID
FROM CUSTOMER
    INNER JOIN CUSTOMERPOSTINGGROUP ON ID =
    CUSTOMER.POSTINGGROUP
    INNER JOIN ACCOUNT ON ID =
    CUSTOMERPOSTINGGROUP.ACCOUNTID
```

When the application detects a request for the ACCOUNT view it will use the structure of the filter query combined with the original view to produce the result. The SQL may look like this:

```
SELECT ID, NAME
FROM ACCOUNT
WHERE ID IN
(
    SELECT ACCOUNT.ID
    FROM CUSTOMER
        INNER JOIN CUSTOMERPOSTINGGROUP ON ID =
        CUSTOMER.POSTINGGROUP
        INNER JOIN ACCOUNT ON ID =
        CUSTOMERPOSTINGGROUP.ACCOUNTID
)
```

The above-provided examples are for illustration purposes and do not constitute a limitation on embodiments. For example, in some embodiment the SQL maybe optimized and the combined SQL may not look like the above example, but may be in a condensed and optimized form.

A filter query may be constructed retrieving data from the views. Alternatively, a user may be enabled to build and attach multiple queries for a view such as a "USER" view. A corresponding query may then be selected and the structure of the query extracted and combined with the original view to provide a filtered view in place of the original view according to request criteria of a user requesting the view.

When the user initiates an access event to access any one of the available views, the structure of the query may be extracted and combined with the original view to generate a filtered view result in place of the original view result. Furthermore, the filtered view result may be restricted to those access events attempting to access data elements encompassed by the query. An access event may be another query to retrieve data from the one of the views. In the provided example, the user may receive all data relevant to accounts provided across by the views.

The application may extract the structure of the query and combine that with the original view to generate a filtered view result in place of the original view result and provide the filtered view result to other users seeking access to a corresponding view. In an example scenario, the application may provide the filtered view to users with inherited permissions from the constructor of the filter query, such as other users related to the query constructor. Example related other users may include peers, managers, direct-reports, co-workers, etc.

Secured views may require a security administrator with privileges to engage and attach security filters. The creation of the security filter query may be performed by someone with detailed knowledge of the data model of the application. It may then be used by anyone to assign as security filter or as a user view. The creator may typically not be the same as the user. For example, the security administrator may create a security filter query and attach to a view. Multiple security queries may be attached to a view. The security administrator may use the security filter query to limit access to the view by only exposing a subset of the data elements of the view. The security administrator may also include evaluation triggers in the security filter query. The application may evaluate criteria such as user privilege to access the view and other settings to extract the structure of the query and combine that with the original view to generate a filtered view result in place of the original view result. The security filter query may use a user identification (id) to determine the user's credentials and access rights to a corresponding view. For a user without sufficient privileges, access to the filtered view may be restricted. Alternatively, the filtered view result may be provided when the user's privileges match criteria sufficiently such as access rights to read data elements.

According to other embodiments, the application may apply the security filter query to a view in response to receiving the security filter query from the security administrator. The application may retrieve metadata for the security filter query from the data store hosting the view. The metadata may include data elements for the defined components in the query such as tables, columns, and row sets. The application may extract table structure definitions from the data store for the view to be filtered. The table structure definitions may include joins and filters. Next, the application may append the table structure definitions to the generated script for the security filter query such as an SQL statement. In addition, the application may attach more than one security filter query to a view. The application may extract the structure of the query and combine that with the original view to generate a filtered view result in place of the original view result and provide the filtered view to a requesting user according to request criteria.

The example scenarios and schemas in FIGS. 2 and 3 are shown with specific components, data types, and configurations. Embodiments are not limited to systems according to these example configurations. Providing a filter query to manage a view may be implemented in configurations employing fewer or additional components in applications and user interfaces. In an example scenario, the filter queries or security filter queries may be used to manage access to data tables or other data entities of a data store. Furthermore, the example schema and components shown in FIG. 2 through 3 and their subcomponents may be implemented in a similar manner with other values using the principles described herein.

Figure 5:
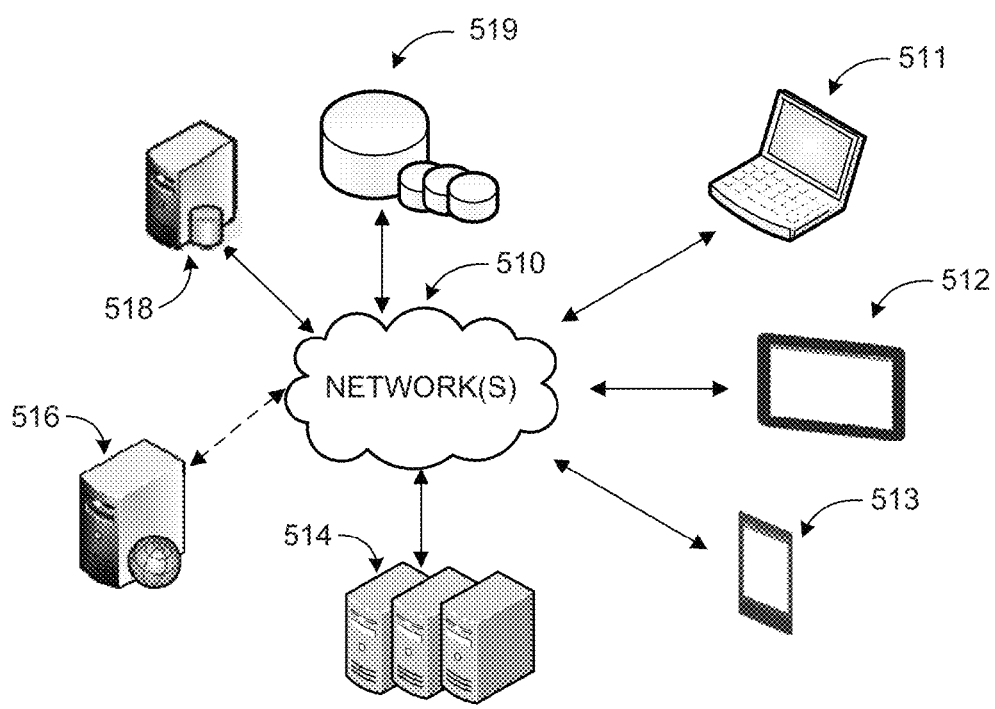
FIG. 5 is a networked environment, where a system according to embodiments may be implemented.

FIG. 5 is a networked environment, where a system according to embodiments may be implemented. Local and remote resources may be provided by one or more servers 514 or a single server (e.g. web server) 516 such as a hosted service. An application, such as a data store application, may communicate with client interfaces on individual computing devices such as a smart phone 513, a tablet device 512, or a laptop computer 511 ('client devices') through network(s) 510.

As discussed above, an application may provide a filter query to manage access to a view. The application may automatically associate a filter query to a view by attaching the filter query to the view. Alternatively, the application may implement a security filter query to control access to a view. Client devices 511-513 may enable access to applications executed on remote server(s) (e.g. one of servers 514) as discussed previously. The server(s) may retrieve or store relevant data from/to data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to provide a filter query to manage access to a view. Furthermore, the networked environments discussed in FIG. 5 are for illustration purposes only. Embodiments are not limited to the example applications, modules, or processes.

Figure 6:
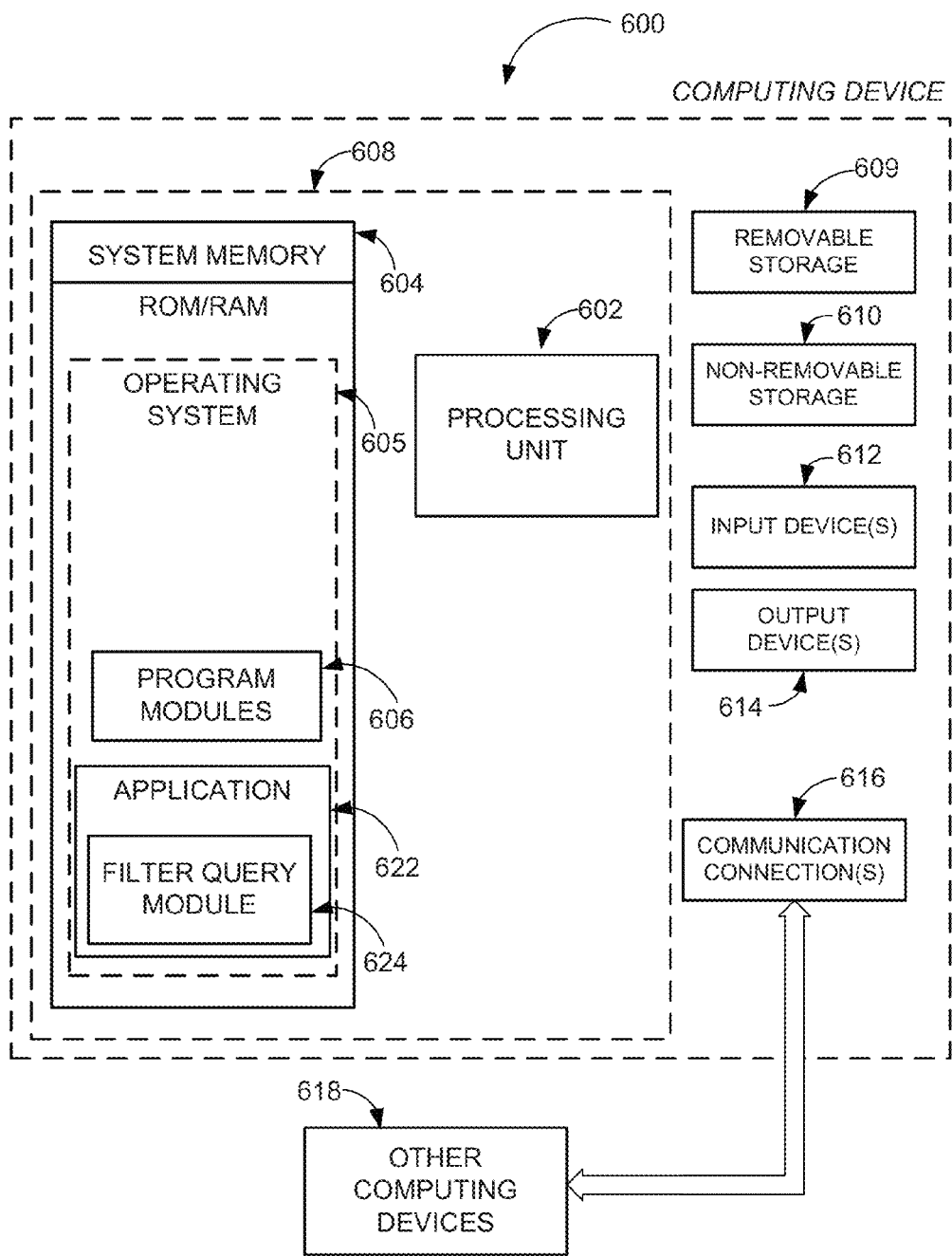
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® and WINDOWS PHONE® operating systems from MICROSOFT CORPORATION of Redmond, Wash. The system memory 604 may also include one or more software applications such as program modules 606, an application 622, and a filter query module 624.

The application 622 may receive a filter query from a user interface component according to embodiments. The filter query module 624 may implement the filter query in a view. Examples may include determining user privileges to access the view and determining data elements to retrieve from the view in response to executing the filter query. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. Computer readable storage media is a computer readable memory device. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, storage servers, and comparable devices. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 7:
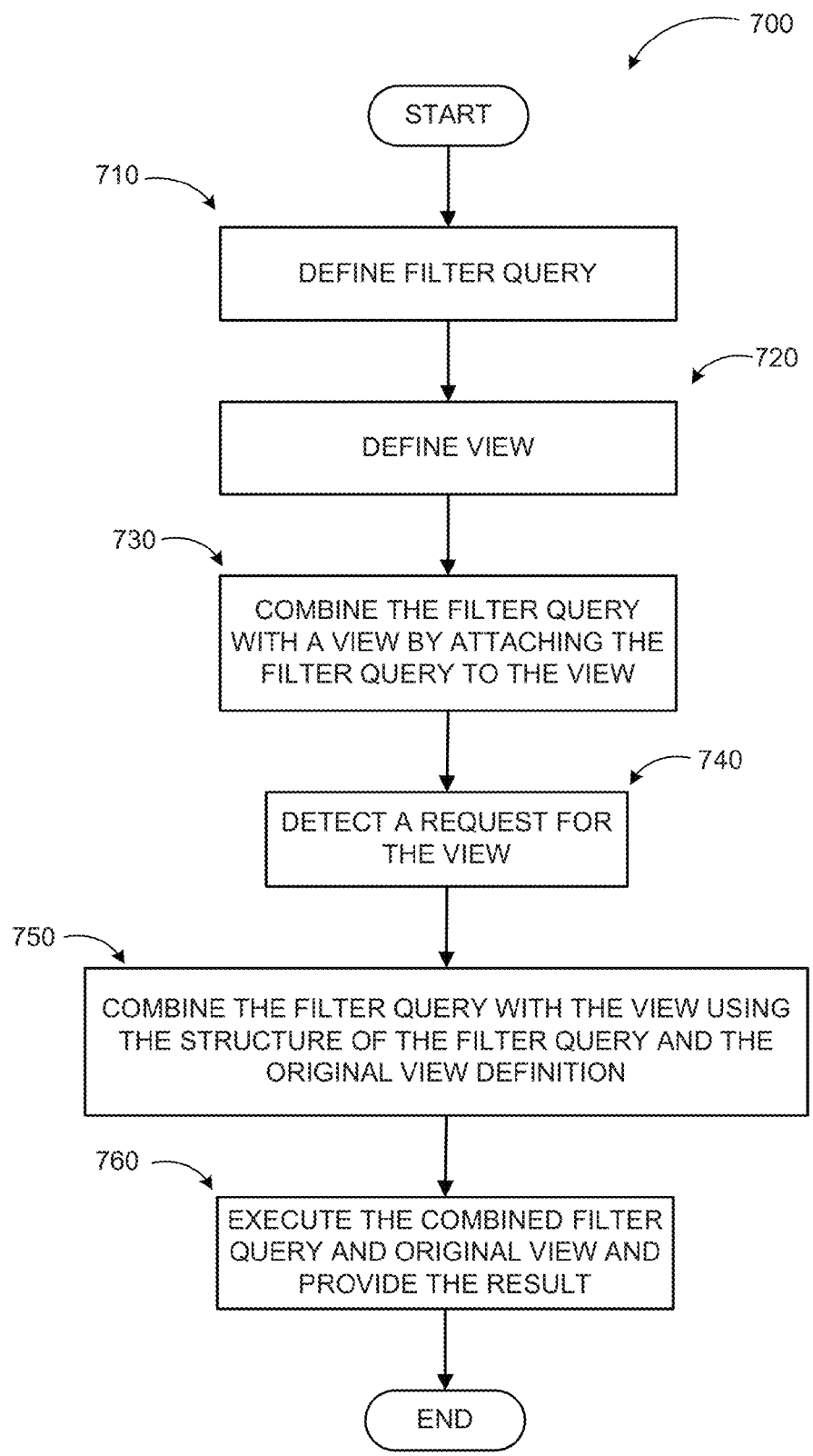
FIG. 7 illustrates a logic flow diagram for a process providing a filter query to manage access to a view according to embodiments.

FIG. 7 illustrates a logic flow diagram for a process providing a filter query to manage access to views according to embodiments. Process 700 may be implemented by an application such as a data store application in some examples.

Process 700 may begin with operation 710 where a filter query may be defined by a user. At operation 720, a view may be defined by a user. Operations 710 and 720 may be performed in any order or together according to some embodiments. At next operation 730 following operations 710 and 720, the filter query may be combined with a view by attaching the filter query to the view. Next, at operation 740, a request for the view may be detected. This may be followed by operation 750, where the filter query may be combined with the view using the structure of the filter query and the original view definition.

Following operation 750, the combined filter query and the original view definition may be executed at operation 760. The results of that execution may be provided to the user also at operation 760.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 700 are for illustration purposes. Providing a filter query to manage access to a view according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to filter views with a predefined query, the method comprising:
   determining at least one view to provide to a user based on access privileges associated with the user;
   determining one or more additional views to provide to the user based on a common element determined between the at least one view and the one or more additional views;
   providing the at least one view and the one or more additional views to the user through a user interface for configuring a filter query, wherein the user is enabled to edit the filter query;
   receiving the filter query from the user through the user interface;
   receiving a view selected by the user from the at least one view and the one or more additional views through the user interface; and
   disabling the filter query in response to a detection of the user editing the filter query to include views and structures unrelated to the view received; else
     evaluating the view to determine criteria sufficient to trigger extraction of a structure of the filter query, wherein the criteria includes user credentials and user access rights to the view; and
     combining the extracted structure of the filter query and the view to generate a filtered view result in place of an original view result.

2. The method of claim 1, further comprising:
   associating the filter query with the view received from the user such that the view is filtered when the user requests data from the view.

3. The method of claim 2, further comprising:
   applying the filter query for other views that are associated with the original view through at least one of a direct relationship and an indirect relationship.

4. The method of claim 3, further comprising:
   applying the filter query for the other views recursively.

5. The method of claim 1, further comprising:
   enabling the user to elect use of the filter query together with the view for a request; and
   filtering the original view result by the filter query.

6. The method of claim 1, further comprising:
   enabling an application to apply the filter query to one or more views in order to obtain the filtered view result.

7. The method of claim 6, further comprising:
   applying the filter query for other views that are associated with the original view through at least one of a direct relationship and an indirect relationship.

8. The method of claim 7, further comprising:
   applying the filter query for the other views recursively.

9. The method of claim 1, further comprising:
   associating the filter query to the view according to a common element; and
   constructing the filter query using the common element.

10. A computing device to filter views with a predefined query, the computing device comprising:

a memory configured to store instructions; and
a processor coupled to the memory, the processor executing an application in conjunction with the instructions stored in the memory, wherein the application is configured to:
- determine at least one view to provide to a user based on access privileges associated with the user;
- determine one or more additional views to provide to the user based on a common element determined between the at least one view and the one or more additional views;
- provide the at least one view and the one or more additional views to the user through a user interface for configuration of a filter query, wherein the user is enabled to edit the filter query;
- receive the filter query from the user;
- receive a view from the user; and
- disable the filter query in response to a detection of the user editing the filter query to include views and structures unrelated to the view received; else
  - combine the filter query and the view to generate a filtered view result in place of an original view result;
  - associate the filter query with the view received from the user such that the view is filtered when the user requests data from the view; and
  - provide the filtered view result to one or more other users seeking access to a corresponding view, wherein the filtered view is provided to the one or more other users with inherited permissions from the user.

11. The computing device of claim 10, wherein the application is further configured to:
apply the filter query for other views that are associated with the original view through at least one of a direct relationship and an indirect relationship recursively.

12. The computing device of claim 11, wherein the application is further configured to:
apply the filter query for the other views recursively.

13. The computing device of claim 10, wherein the application is further configured to:
enable the user to elect use of the filter query together with the view for a request; and
filter the original view result by the filter query.

14. The computing device of claim 10, wherein the application is further configured to:
enable another application to apply the filter query to one or more views in order to obtain the filtered view result.

15. The computing device of claim 14, wherein the application is further configured to:
apply the filter query for other views that are associated with the original view through at least one of a direct relationship and an indirect relationship recursively.

16. The computing device of claim 10, wherein the application is further configured to:
retrieve metadata for the filter query from a data store hosting the view.

17. A method to filter views with a predefined query, the method comprising:
- determining at least one view to provide to a user based on access privileges associated with the user;
- determining one or more additional views to provide to the user based on a common element determined between the at least one view and the one or more additional views;
- providing the at least one view and the one or more additional views to the user through a user interface for configuring a filter query, wherein the user is enabled to edit the filter query;
- receiving the filter query from the user through the user interface;
- receiving a view selected by the user from the at least one view and the one or more additional views through the user interface; and
- disabling the filter query in response to a detection of the user editing the filter query to include views and structures unrelated to the view received; else
  - combining the filter query and the view to generate a filtered view result in place of an original view result;
  - associating the filter query with the view received from the user such that the view is filtered when the user requests data from the view;
  - applying the filter query for other views that are associated with the original view through at least one of a direct relationship and an indirect relationship; and
  - providing the filtered view result to one or more other users seeking access to a corresponding view, wherein the filtered view is provided to the one or more other users with inherited permissions from the user.

18. The method of claim 17, further comprising:
enabling the user to apply the filter query to one or more views in order to obtain the filtered view result; and
filtering the result of the view by the filter query.

19. The method of claim 17, further comprising:
enabling an application to apply the filter query to one or more views in order to obtain a filtered result; and
filtering the result of the view by the filter query.

20. The method of claim 17, further comprising:
applying the filter query for the other views recursively.

* * * * *